__US009652052B2__

(12) United States Patent
Chang (10) Patent No.: US 9,652,052 B2
(45) Date of Patent: May 16, 2017

(54) OPTICAL MINI-MOUSE

(71) Applicant: PIXART IMAGING INC., Hsin-Chu County (TW)

(72) Inventor: Yen-Min Chang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 14/967,735

(22) Filed: Dec. 14, 2015

(65) Prior Publication Data
US 2016/0098100 A1 Apr. 7, 2016

Related U.S. Application Data

(63) Continuation-in-part of application No. 14/144,914, filed on Dec. 31, 2013, now Pat. No. 9,244,540.

(30) Foreign Application Priority Data
Jun. 20, 2013 (TW) .............................. 102121888 A (51) Int. Cl.
*G06F 3/033* (2013.01)
*G06F 3/03* (2006.01)
*G06F 3/0354* (2013.01)

(52) U.S. Cl.
CPC ........ *G06F 3/0317* (2013.01); *G06F 3/03543* (2013.01)

(58) Field of Classification Search
CPC .... G06F 3/0304; G06F 3/0312; G06F 3/0317; G06F 3/033; G06F 3/0354; G06F 3/03543; G06F 2203/0335; G06F 2203/0336
See application file for complete search history.

(56) References Cited

U.S. PATENT DOCUMENTS

| | | | |
|---|---|---|---|
| 5,847,696 A | 12/1998 | Itoh et al. | |
| 6,304,246 B1 | 10/2001 | Kuth et al. | |
| 6,369,798 B1 | 4/2002 | Yatsu et al. | |
| 7,557,795 B2* | 7/2009 | Kong ................... | G01S 7/4916 345/156 |
| 7,724,238 B2 | 5/2010 | Daniel et al. | |
| 7,764,270 B2 | 7/2010 | Shigeno et al. | |
| 8,648,805 B2 | 2/2014 | Bailen | |
| 2003/0160765 A1 | 8/2003 | Gordon | |
| 2003/0160766 A1 | 8/2003 | Gordon | |
| 2004/0012568 A1 | 1/2004 | Velikov et al. | |
| 2004/0095323 A1 | 5/2004 | Ahn | |
| 2005/0168445 A1* | 8/2005 | Piot ....................... | G06F 3/0317 345/163 |
| 2006/0022943 A1 | 2/2006 | Johnson et al. | |
| 2006/0213997 A1* | 9/2006 | Frank .................... | G06F 3/0317 235/462.15 |
| 2006/0284845 A1 | 12/2006 | Wu et al. | |

(Continued)

FOREIGN PATENT DOCUMENTS

TW M326670 U 2/2008

*Primary Examiner* — Joe H Cheng
(74) *Attorney, Agent, or Firm* — Hauptman Ham, LLP (57) ABSTRACT

There is provided an optical mini-mouse including a mouse case and a navigation module. The mouse case includes a valley and a flat region arranged along a length direction and the valley extends along a width direction. When the mouse case is rotated about the valley, the navigation module is configured to detect a rotation.

20 Claims, 11 Drawing Sheets

(56) References Cited

U.S. PATENT DOCUMENTS

| | | | |
|---|---|---|---|
| 2007/0102523 A1* | 5/2007 | Kong | G06K 7/10851 |
| | | | 235/462.16 |
| 2007/0152966 A1* | 7/2007 | Krah | G06F 3/016 |
| | | | 345/163 |
| 2008/0106523 A1 | 5/2008 | Conrad | |
| 2008/0284735 A1 | 11/2008 | Shim | |
| 2009/0231275 A1 | 9/2009 | Odgers | |
| 2010/0085159 A1 | 4/2010 | Desjeux et al. | |
| 2010/0188336 A1 | 7/2010 | Ng et al. | |
| 2011/0102319 A1* | 5/2011 | Lin | G06F 3/03543 |
| | | | 345/158 |
| 2011/0169738 A1 | 7/2011 | Reigneau | |
| 2011/0298711 A1 | 12/2011 | Dean et al. | |
| 2012/0206353 A1* | 8/2012 | Chang | G06F 3/03543 |
| | | | 345/158 |
| 2013/0072771 A1 | 3/2013 | Gu et al. | |
| 2013/0076629 A1* | 3/2013 | Lin | G06F 3/0317 |
| | | | 345/166 |
| 2013/0113705 A1 | 5/2013 | Gu et al. | |
| 2013/0120262 A1 | 5/2013 | Piot et al. | |
| 2013/0241835 A1 | 9/2013 | Lee | |

\* cited by examiner

OPTICAL MINI-MOUSE

CROSS REFERENCE TO RELATED APPLICATION

The present application is a continuation-in-part application of U.S. Ser. No. 14/144,914, filed on Dec. 31, 2013, now U.S. Pat. No. 9,244,540 B2, the disclosure of which is hereby incorporated by reference herein in its entirety.

BACKGROUND

1. Field of the Disclosure

This disclosure generally relates to an input device and, more particularly, to an optical mini-mouse with easy operation and expanded functions.

2. Description of the Related Art

Figure 1A:
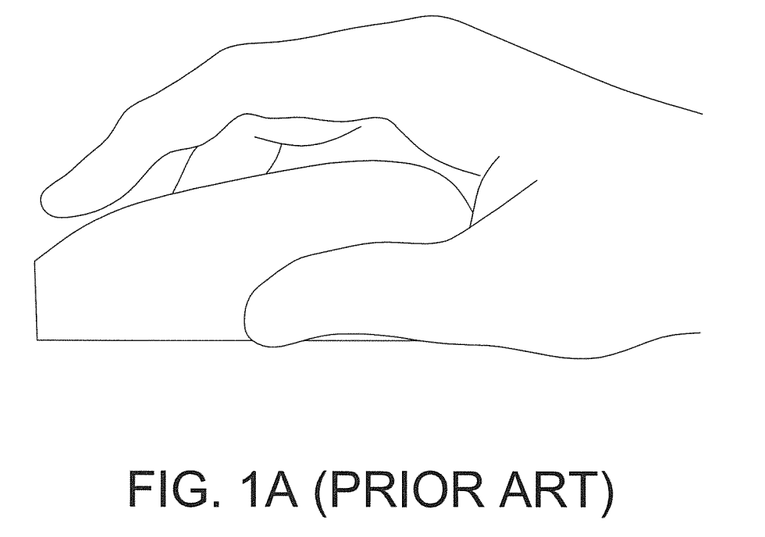
FIG. 1A is a schematic diagram of the conventional mouse device.

Peripheral devices of the personal computer system generally include a mouse device served as an interactive interface between a user and the computer system. For example, FIG. 1A shows a conventional mouse device. The user grabs the whole mouse device with his/her palm in order to move the mouse device on a work surface thereby controlling an electronic device accordingly. However, this kind of mouse device has a large size and is not convenient to carry. Therefore, it is not suitable to cooperate with portable devices such as a portable computer or a tablet computer.

Figure 1B:
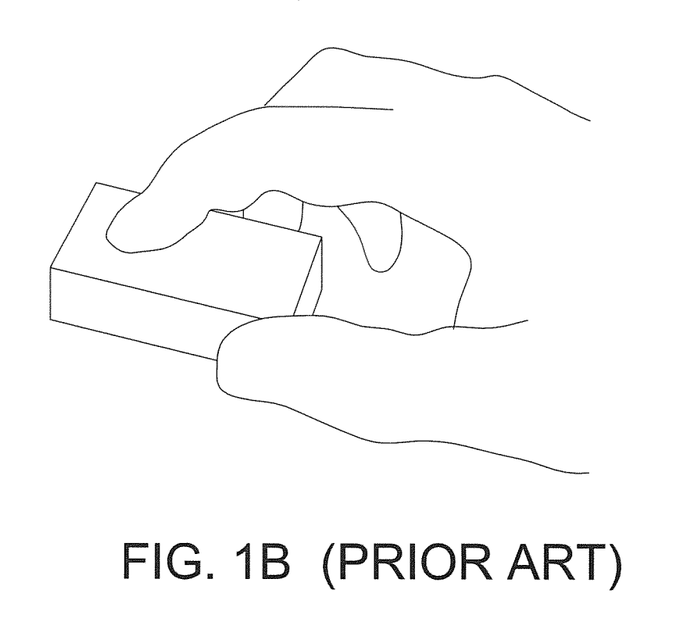
FIG. 1B is a schematic diagram of the conventional mini-mouse.

In order to allow the mouse device to be carried easily, the industry has proposed a mini-mouse as shown in FIG. 1B. This kind of mini-mouse has a width smaller than 4 cm in order to be operated by a single finger thereon. Although the size of this kind of mini-mouse is significantly reduced and can be carried easily, in actual operation the user still has to use at least three fingers to grab the mini-mouse for moving and the user can get tired easily for a long-time operation.

Accordingly, the present disclosure further provides an optical mini-mouse that has an improved ergonomic design so as to reduce the tiredness of long-time operation as well as expand the operating functions and increase the practicality by detecting a rotation.

SUMMARY

The present disclosure provides an optical mini-mouse that has an operating region capable of accommodating two or three fingers of a user and may be moved or rotated on a work surface so as to increase the operating convenience and expand the operating functions.

The present disclosure provides an optical mini-mouse on an upper surface of which a valley is formed to be served as an operating region such that a user may put his/her fingers in the operating region to easily move or rotate the mouse device on a work surface without getting tired even for a long-time operation.

The present disclosure provides an optical mini-mouse including a mouse case, a navigation module and a finger detection module. The mouse case includes an operating region and an accommodation space arranged along a length direction. The navigation module is disposed inside the accommodation space and includes a plurality of image sensors respectively configured to detect a rotation direction of the optical mini-mouse with respect to a work surface and identify a rotation mode according to the rotation directions detected by different image sensors. The finger detection module is configured to detect at least one of a click event and a slide event in the operating region.

The present disclosure further provides an optical mini-mouse including a mouse case, a navigation module and a finger detection module. The mouse case has a width and a length, and a first thickness and a second thickness along a length direction of the length. The navigation module is disposed inside an inner space of a region of the second thickness of the mouse case and includes a plurality of image sensors respectively configured to detect a rotation direction of the optical mini-mouse with respect to a work surface and identify a rotation mode according to the rotation directions detected by different image sensors. The finger detection module is formed in a region of the first thickness of the mouse case and configured to detect at least one of a click event and a slide event.

The present disclosure further provides an optical mini-mouse including a mouse case, a navigation module and a finger detection module. The mouse case includes a valley and a flat region adjacently arranged along a length direction, wherein the valley extends along a width direction. The navigation module includes a plurality of image sensors respectively configured to detect a rotation direction of the optical mini-mouse with respect to the work surface and identify whether the mouse case is rotated about the valley according to the rotation directions detected by different image sensors. The finger detection module is configured to detect at least one of a click event and a slide event of the valley.

In one aspect, the finger detection module includes at least one mechanical button, a roller, at least one capacitive switch and/or at least one optical switch disposed in the operating region.

In one aspect, the navigation module includes a light source configured to illuminate the work surface through an opening of the mouse case and an image sensor configured to receive reflected light of the work surface through the opening to output image frames.

In one aspect, the operating region is formed as a valley of two sides along the length direction higher than a center part or formed as a tilted surface tilting toward a direction away from the accommodation space.

In the optical mini-mouse according to the embodiment of the present disclosure, the operating region of the mouse case is adapted to accommodate two or three fingers. When a user is operating the optical mini-mouse according to the embodiment of the present disclosure, the user may put his/her palm on the work surface and move the optical mini-mouse easily on the work surface only with his/her fingers without getting tired even after a long-time operation. In addition, the optical mini-mouse according to the embodiment of the present disclosure may be rotated about the operating region (or valley) by fingers so as to expand the operating functions, e.g. controlling the increment or decrement of two-phase parameters such as volume, zooming and scrolling.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 2A:
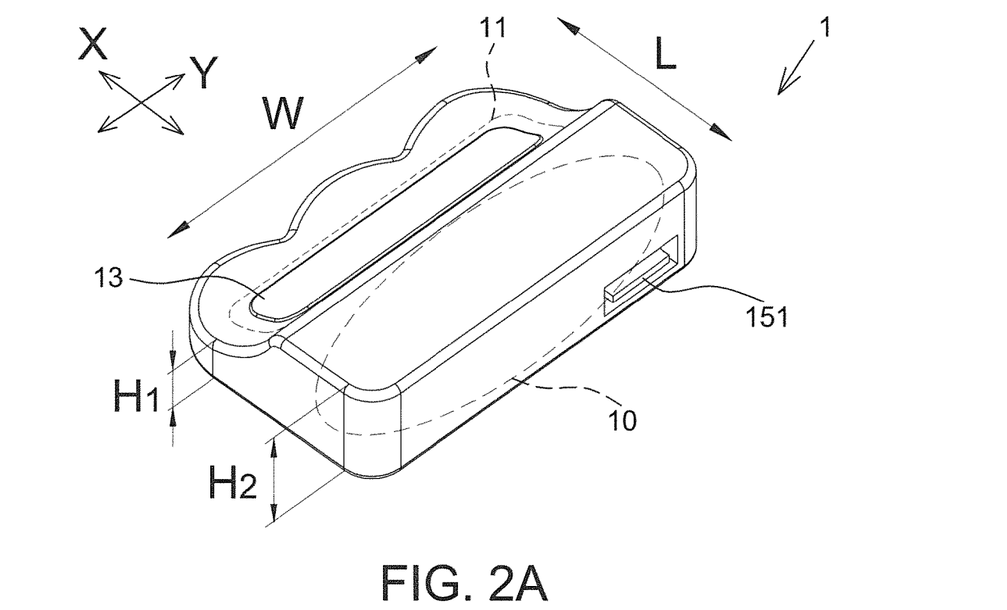
FIGS. 2A and 2B are respectively a perspective view of the optical mini-mouse according to an embodiment of the present disclosure.
Figure 2B:
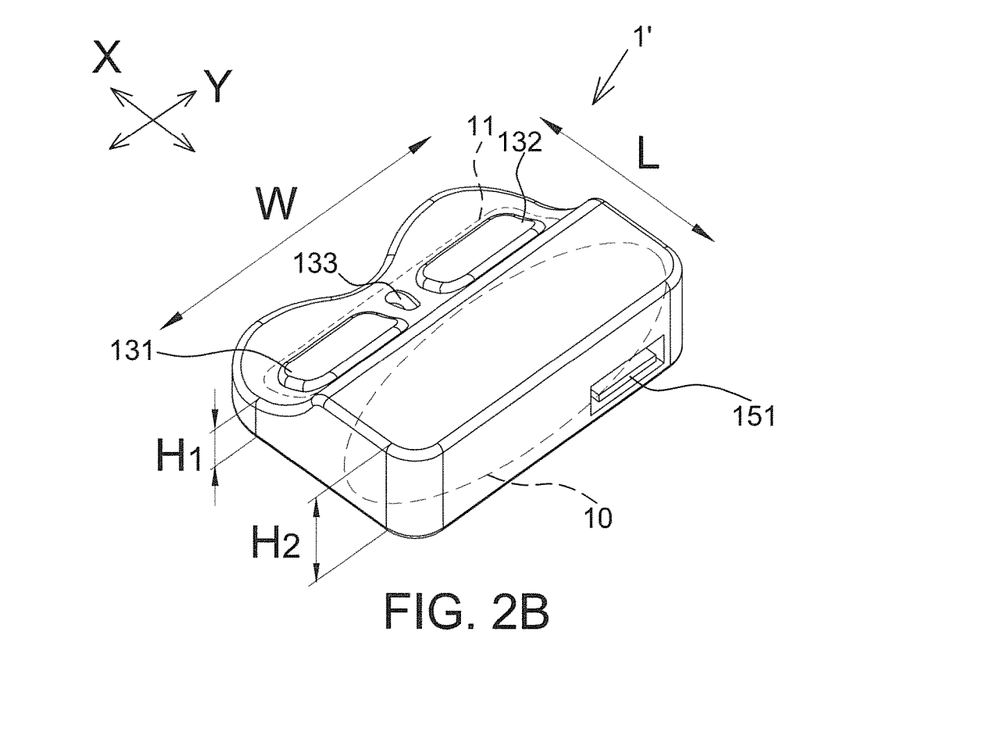
Figure 3:
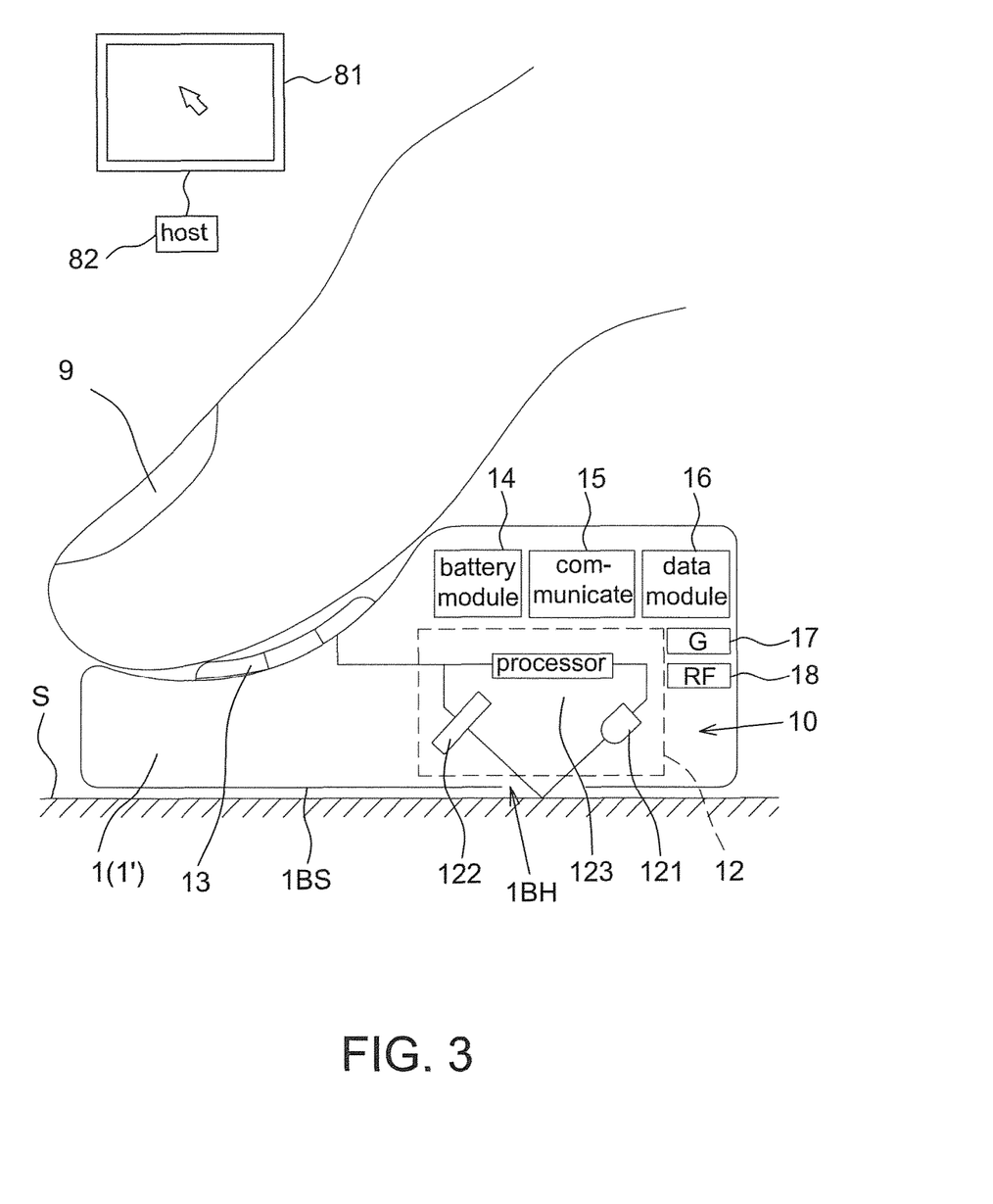
FIG. 3 is a schematic block diagram of the optical mini-mouse according to an embodiment of the present disclosure.

Referring to FIGS. 2A, 2B and 3, FIGS. 2A and 2B respectively show a perspective view of the optical mini-mouse 1 according to an embodiment of the present disclosure and FIG. 3 shows a schematic block diagram of the optical mini-mouse 1 according to an embodiment of the present disclosure. The optical mini-mouse 1 according to the embodiment of the present disclosure is adapted to be operated by two or three fingers of a user on a work surface S, and includes a mouse case, a navigation module 12 and a finger detection module 13. The mouse case has a width W and a length L, and has a first thickness H1 and a second thickness H2 along a length direction of the length L (e.g. the X direction in figure), wherein the second thickness H2 is larger than the first thickness H1. In this embodiment, the length L is preferably smaller than the width W thereby reducing as much as possible the device size.

In the embodiment of the present disclosure, in order to conform to ergonomics and reduce the total size as much as possible, the width W is preferably between 4 cm and 6 cm so as to accommodate two or three fingers therein. For example, FIG. 2A shows an embodiment for accommodating three fingers, and thus the width W is preferably between 5 cm and 6 cm; and FIG. 2B shows an embodiment for accommodating two fingers, and thus the width W is preferably between 4 cm and 5 cm. The length L is preferably between 3 cm and 5 cm, wherein the length L may be determined according to the required inner space for accommodating all elements inside the mouse case. The first thickness H1 may be between 0.3 cm and 0.5 cm, wherein the first thickness H1 may be as thin as possible as long as the structure strength can be kept and the finger detection module 13 (described later) can be disposed. The second thickness H2 may be between 0.7 cm and 1.3 cm, wherein a region of the second thickness H2 is for accommodating most of the elements. The second thickness H2 is also as thin as possible as long as all elements needed in operation, e.g. including a navigation module 12, a battery module 14, a communication interface 15, a data storage module 16, a two-dimensional gravity sensor (G) 17 and/or a RF transceiver module (RF) 18, can be disposed therein. In other words, the width W may be determined according to the number of fingers to be accommodated so that it has a lower limit. The length L is preferably manufactured as short as possible as long as all elements can be accommodated therein so as to reduce the device size as much as possible.

It should be mentioned that although FIGS. 2A and 2B show that a front end of the optical mini-mouse 1 and 1' has a wave shape, the present disclosure is not limited thereto. The front end may be formed as a parabolic or a straight line without particular limitation.

The mouse case has an operating region 11 and an accommodation space 10 arranged along a length direction (e.g. the X direction in figure), wherein the operating region 11 has the first thickness H1 and the width W. The accommodation space 10 is an inner space of a region of the second thickness H2 and thus has the second thickness H2. In one embodiment, in order to allow the user's finger to push/pull the optical mini-mouse 1 on the work surface S easily, the operating region 11 is preferably formed as a valley of two sides along the length direction higher than a center part thereof, and the valley extends along a width direction (e.g. the Y direction in figure). Herein, the first thickness H1 may be an average thickness of the valley. In one embodiment, the surface of the valley may be a rough surface so as to increase the static friction with respect to the finger surface. An upper surface corresponding to a region of the second thickness H2 may be formed as a flat region. However, the present disclosure is not limited thereto, and the upper surface corresponding to the region of the second thickness H2 may also be formed as a curved surface. In another embodiment, the operating region 11 may also be formed as a tilted surface, and a surface of the tilted surface may be a rough surface so as to increase the static friction with respect to the finger surface. In the present disclosure, the width W of the operating region 11 may or may not be identical to that of the accommodation space 10, and the width W of the mouse case may be arranged to monotonically decrease or increase along the length direction.

In anther embodiment, upper surfaces of the operating region 11 and the accommodation space 10 are flat surfaces or curved surfaces, and a vertical surface, a tilted surface or a curved surface may be arranged to connect between said two upper surfaces.

The navigation module 12 is disposed inside the accommodation space 10 and configured to detect a movement of the optical mini-mouse 1 with respect to the work surface S. For example, the navigation module 12 may include a light source 121, an image sensor 122 and a processor 123.

The light source 121 may be a light emitting diode, a laser diode or other active light sources, and is configured to emit identifiable light spectrum, preferably invisible light. The light source 121 is configured to illuminate the work surface S through an opening 1BH at a bottom surface IBS of the mouse case.

The image sensor 122 may be a CCD image sensor, a CMOS image sensor or other optical sensors, and is configured to receive reflected light from the work surface S through opening 1BH and to output image frames formed by image data of every pixel.

Figure 4A:
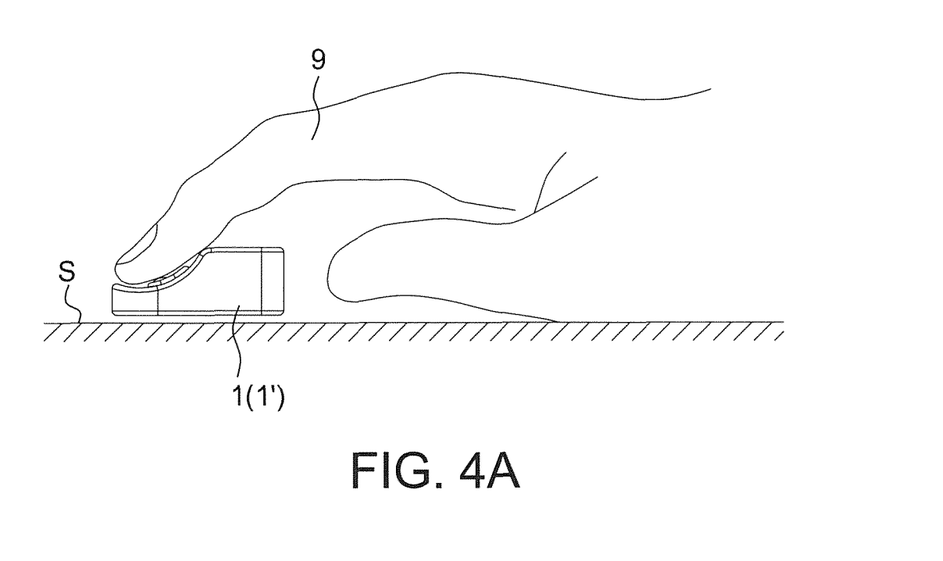
FIGS. 4A and 4B are schematic diagrams of operating the optical mini-mouse according to the embodiment of the present disclosure.
Figure 4B:
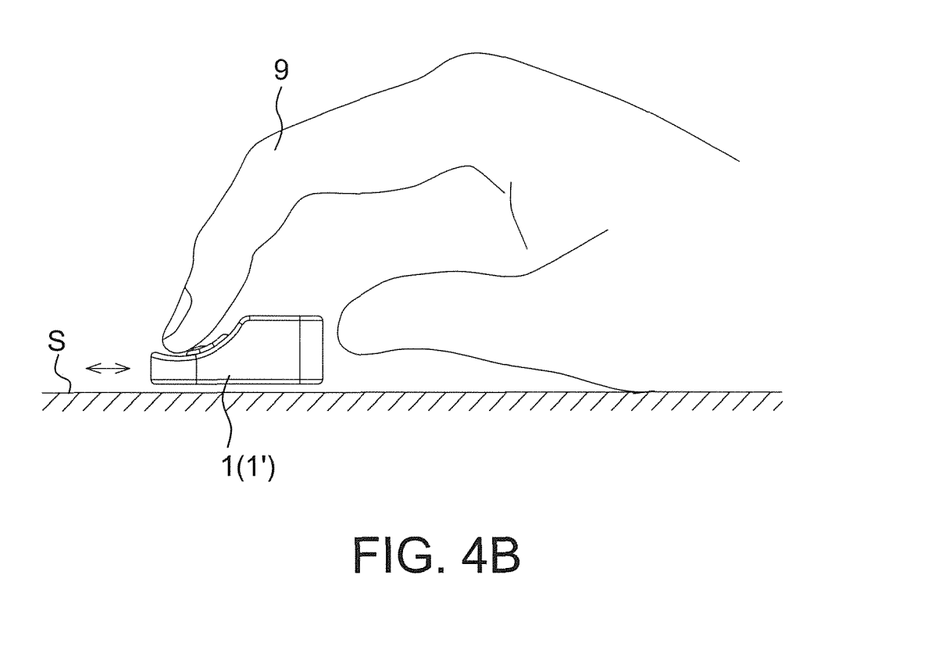

The processor 123 may be a digital signal processor (DSP), a microcontroller unit (MCU), a central processing unit (CPU) or an application specified integrated circuit (ASIC), and is configured to post-process image frames outputted from the image sensor 122 and calculate a movement (e.g. according to the correlation between images) of the optical mini-mouse 1 with respect to the work surface S by comparing at least two image frames. For example referring to FIGS. 4A and 4B, the user only needs to put his/her fingers 9 in the operating region 11 and then to bend or stretch fingers 9, the optical mini-mouse 1 can be easily moved on the work surface S. As the palm of the user does not need to be left off or moved on the work surface S, the user does not get tired even after a long-time operation. In addition, the navigation module 12 may further include at least one light guiding element configured to guide the light emitted from the light source 121 and/or the reflected light of the work surface S.

In this embodiment, as the navigation module 12 is disposed inside the accommodation space 10, the opening 1BH on the bottom surface IBS is opposite to the accommodation space 10 and the upper surface thereof; i.e. the opening 1HB is positioned at the rear half part of the mouse case instead of at the center part. In addition, the bottom surface IBS is preferably made of material suitable to be moved on the work surface S.

Figure 5A:
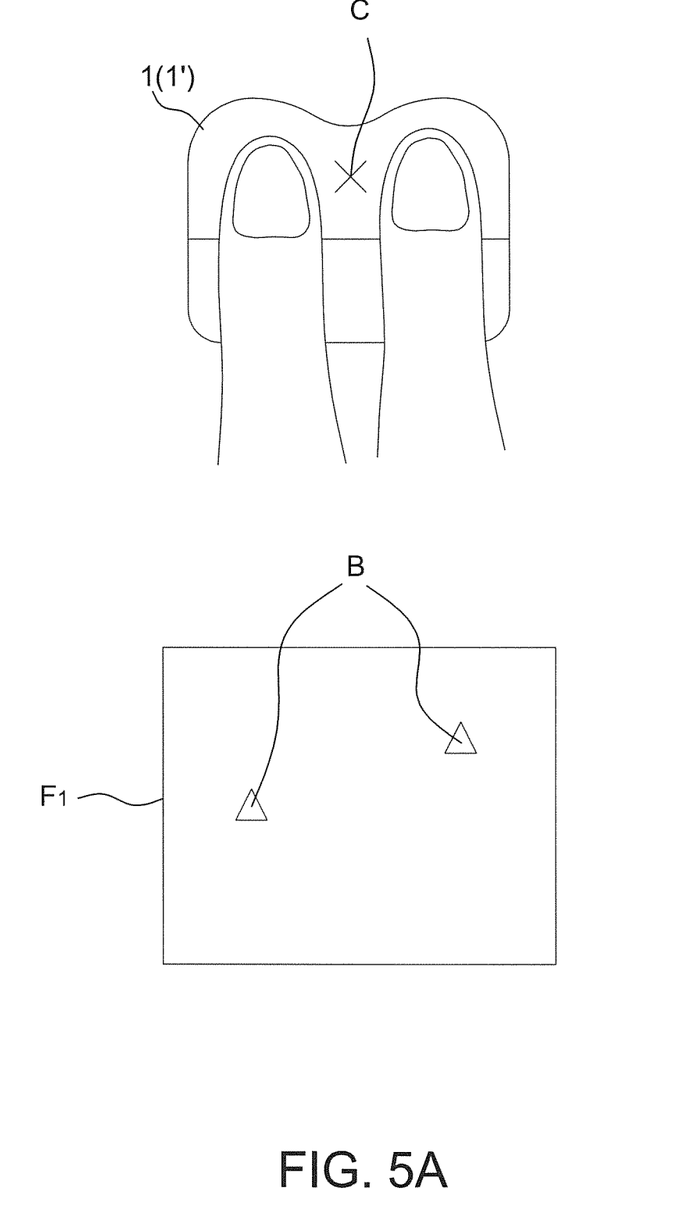
FIGS. 5A to 5C are schematic diagrams of operating the optical mini-mouse according to the embodiment of the present disclosure and the captured image frames.
Figure 5B:
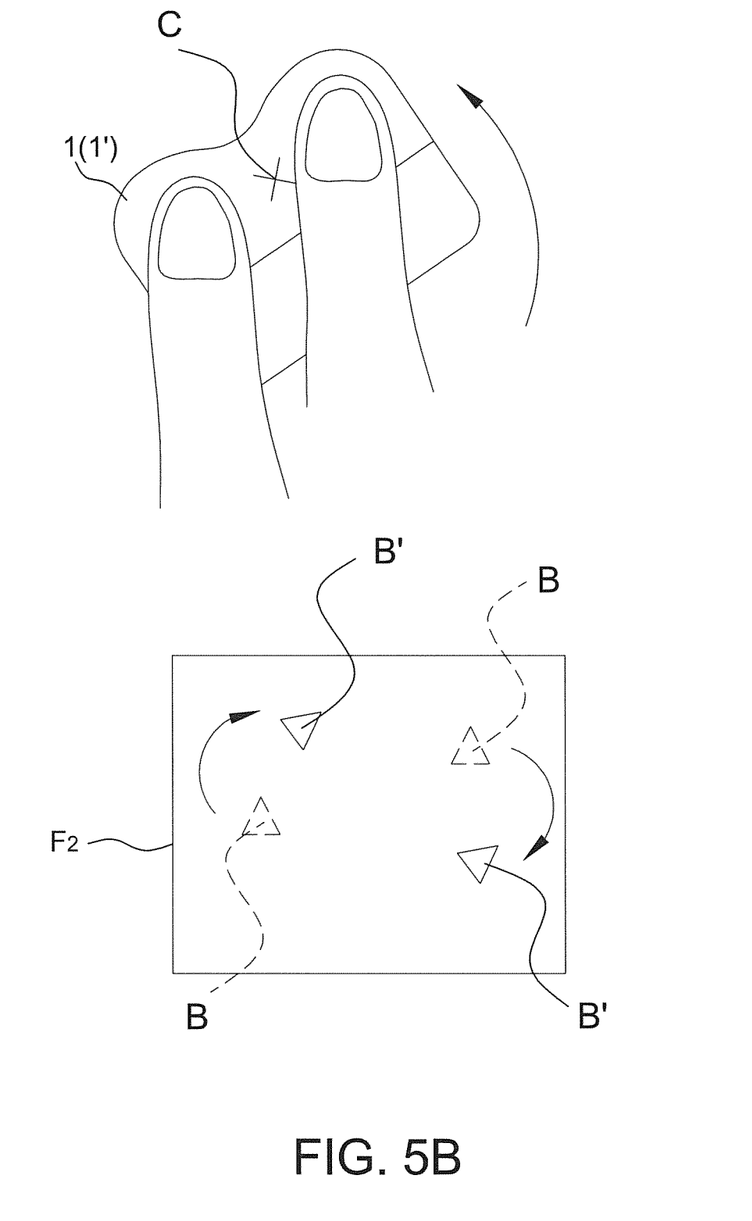
Figure 5C:
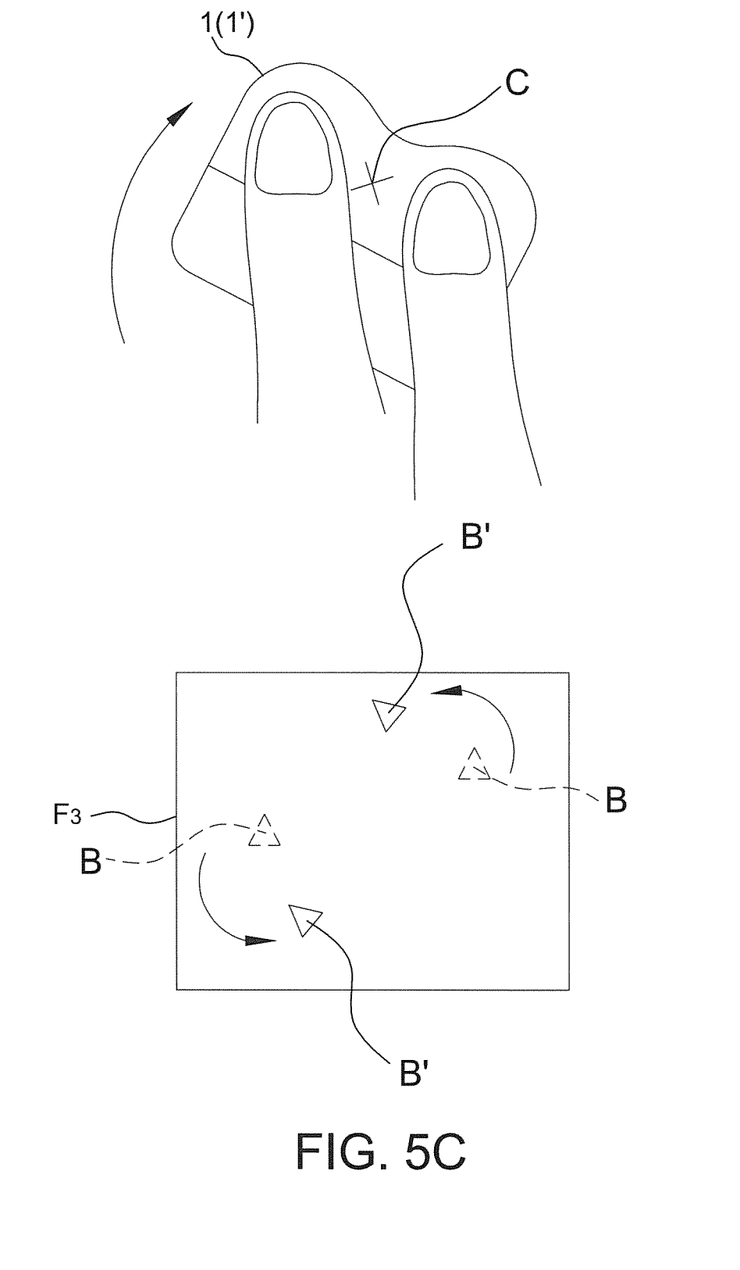

In another embodiment, the navigation module 12 may further be configured to calculate a rotation of the optical mini-mouse 1 with respect to the work surface S according to a plurality of image frames captured by the image sensor 122. For example referring to FIGS. 5A-5C, they show schematic diagrams of the operating state of the optical mini-mouse 1 and the captured image frames, wherein FIG. 5A shows an image frame F1 captured when the optical mini-mouse 1 is not rotated; FIG. 5B shows an image frame F2 captured when the optical mini-mouse 1 is rotated counterclockwise about the operating region 11; and FIG. 5C shows an image frame F3 captured when the optical mini-mouse 1 is rotated clockwise about the operating region 11. The navigation module 12 identifies the position variation of the corresponding brightness features B according to the correlation between image frames to accordingly calculate a rotation; for example, calculating a counterclockwise rotation according to the image frames F1 and F2 or calculating a clockwise rotation according to the image frames F1 and F3.

It should be mentioned that in this embodiment the optical mini-mouse 1 is rotated by the finger about the valley (i.e. the finger operating region 11), e.g. rotated substantially about a center C of the valley, instead of being rotated about the center of the optical mini-mouse 1. Therefore, the image sensor 122 is preferably arranged corresponding to the center C, e.g. on a center line passing through the center C. In addition, numbers and positions of the brightness features B and B' given herein are only intended to illustrate but not to limit the present disclosure, wherein the brightness features B and B' are, for example, pixels have a gray value exceeding a predetermined threshold. In addition, although FIGS. 5A to 5C only show the operation with two fingers, the operation with three fingers is similar thereto, i.e. rotated about the operating region 11 so details thereof are not repeated herein.

Figure 6A:
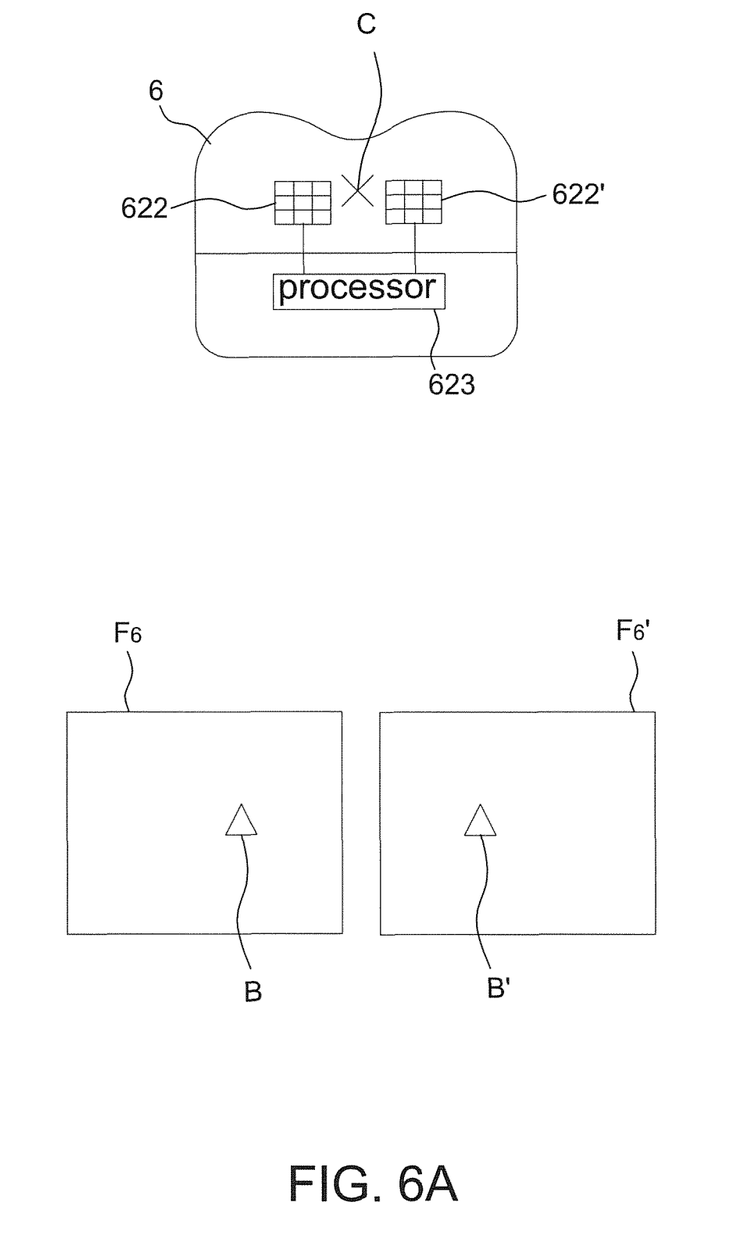
FIGS. 6A to 6C are schematic diagrams of operating the optical mini-mouse according to other embodiments of the present disclosure and the captured image frames.
Figure 6B:
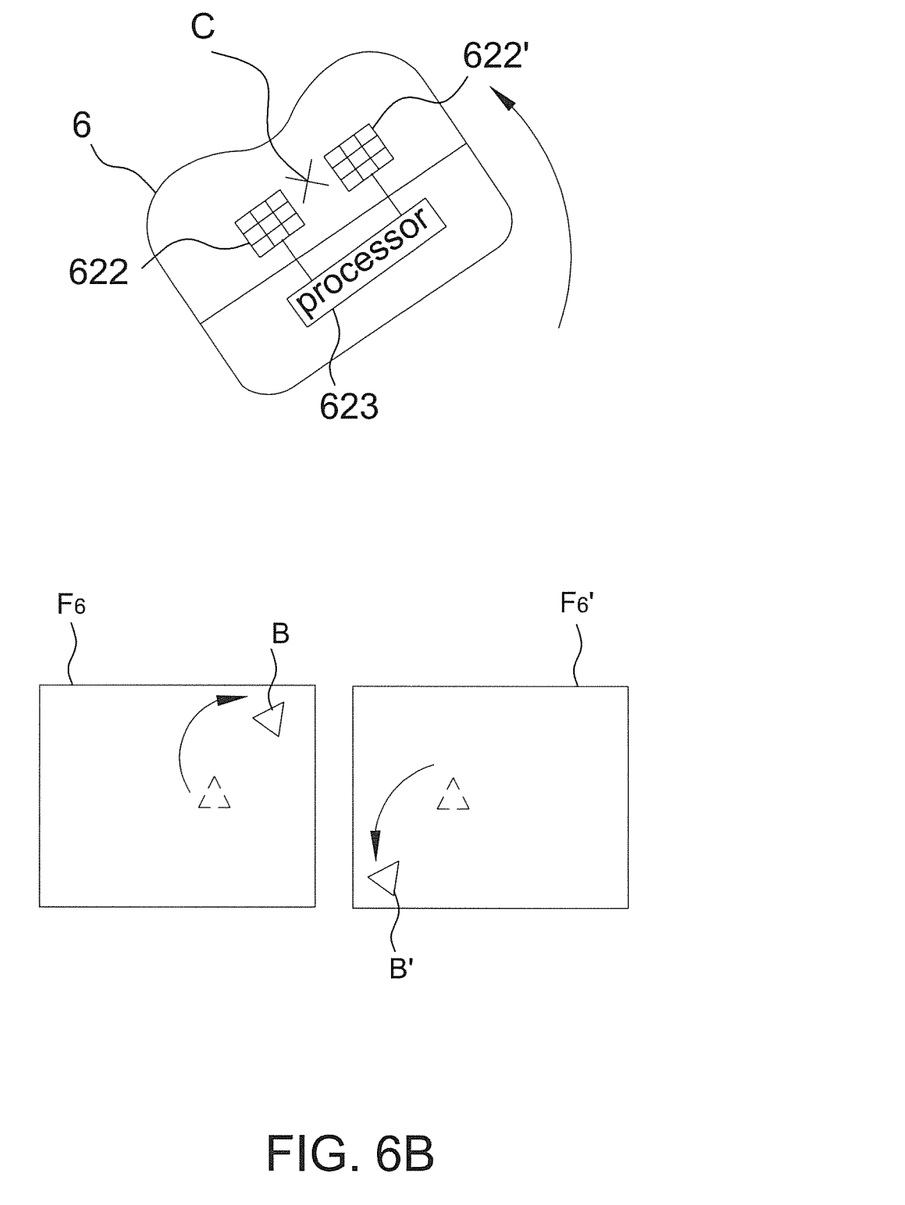
Figure 6C:
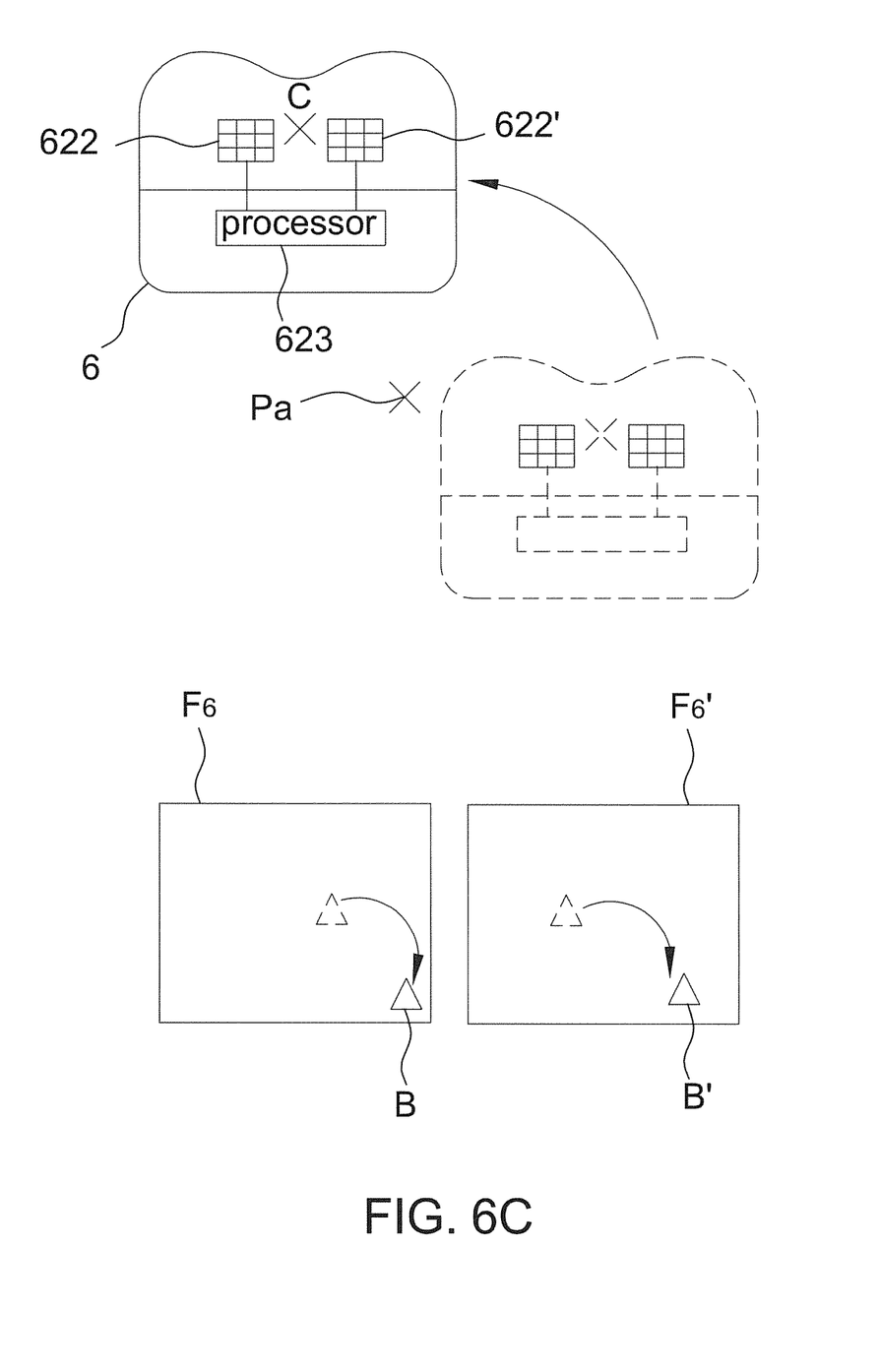

Referring to FIGS. 6A-6C, they are schematic diagrams of operating the optical mini-mouse 6 according to other embodiments of the present disclosure and the captured image frames F6 and F6'. As mentioned above, the optical mini-mouse of the present disclosure is adaptable to detect rotations. The rotation mode includes an in-place rotation and a circular rotation. For example, said in-place rotation is referred to that a user rotates the optical mini-mouse 6 about a position (e.g. the center C) within the optical mini-mouse 6 (e.g. shown in FIGS. 5B and 5C); and said circular rotation is referred to that a user rotates the optical mini-mouse 6 about an arbitrary position Pa (as shown in FIG. 6C) outside the optical mini-mouse 6 to draw an arc, a curve or a circle using the optical mini-mouse 6.

To distinguish the in-place rotation and the circular rotation, the optical mini-mouse 6 according to other embodiments of the present disclosure includes a plurality of image sensors respectively configured to detect a rotation direction of the optical mini-mouse 6 with respect to the work surface S, and identify a rotation mode according to the rotation directions detected by different image sensors. For example, the image sensors are included in a navigation module 12 together with a processor 623, which is identical to the processor 123 of FIG. 3.

For example, FIGS. 6A-6C show two image sensors 622 and 622', but a number of the image sensors is not limited thereto. The two image sensors 622 and 622' respectively output an image frame F6 and F6' to the processor 623 for post-processing. More specifically, the difference of this embodiment from the previous embodiment is that the optical mini-mouse 6 of this embodiment has a different number of the image sensors from the optical mini-mouse 1, but other elements and functions thereof are identical to the optical mini-mouse 1. Details of identifying a rotation mode according to image frames captured by different image sensors are illustrated hereinafter.

In the embodiment of the in-place rotation, the two image sensors 622 and 622' are preferably arranged at two sides of a center line passing through the center C since said in-place rotation is substantially rotate about the center C. It is appreciated that since different users have different operation habits, the in-place rotation may not be rotated about the center C. Distances from the two image sensors 622 and 622' to the center C (or the center line) do not have particular limitations. FIG. 6B is a schematic diagram of the optical mini-mouse 6 being in-place rotated toward a counterclockwise direction. A first image sensor 622 outputs a first image frame F6 and a second image sensor 622' outputs a second image frame F6'. It is known from FIGS. 6A and 6B, in the first image frames F6, a brightness feature B substantially rotates toward the clockwise direction with time due to its arrangement; and in the second image frames F6', a brightness feature B' substantially rotates toward the counterclockwise direction with time due to its arrangement. It is appreciated that when the optical mini-mouse 6 is rotated toward an opposite direction (e.g. clockwise direction), the rotation directions of the brightness feature B and B' are reversed.

Accordingly, after receiving the first image frames F6 and the second image frames F6' from the two image sensors 622 and 622', the processor 623 calculates the rotation of the brightness features B and B'. When identifying that a rotation direction of the rotation corresponding to the first image frames F6 is opposite to that corresponding to the second image frames F6', the processor 623 identifies an in-place rotation. The processor 623 generates an in-place rotation signal $S_{r1}$ to a host 82 corresponding to the in-place rotation mode via a communication interface 15. Preferably, the first image frame F6 and the second image frame F6' are captured synchronously, but not limited thereto. It is possible that the first image frame F6 and the second image frame F6' are captured sequentially.

In the embodiment of the circular rotation, positions of the two image sensors 622 and 622' do not have particular limitations. However, if the optical mini-mouse 6 also has the function to detect the in-place rotation, the two image sensors 622 and 622' are also arranged at two sides of the center line. FIG. 6C is a schematic diagram of the optical mini-mouse 6 being circularly rotated toward a counterclockwise direction. The first image sensor 622 outputs a first image frame F6 and the second image sensor 622' outputs a second image frame F6'. It is known from FIGS. 6A and 6C, in the first image frames F6, the brightness feature B substantially rotates toward the clockwise direction with time; and in the second image frames F6', the brightness feature B' also substantially rotates toward the clockwise direction with time. It is appreciated that when the optical mini-mouse 6 is rotated toward an opposite direction (e.g. clockwise direction), the rotation directions of the brightness feature B and B' are reversed.

Accordingly, after receiving the first image frames F6 and the second image frames F6' from the two image sensors 622 and 622', the processor 623 calculates the rotation of the brightness features B and B'. When identifying that a rotation direction of the rotation corresponding to the first image frames F6 is identical to that corresponding to the second image frames F6', the processor 623 identifies a circular rotation. The processor 623 generates a circular rotation signal $S_{r2}$ to the host 82 corresponding to the circular rotation mode via the communication interface 15.

In addition, another characteristic of the circular rotation is that a first angular speed of the brightness feature B detected by the first image sensor 622 is substantially a multiple of a second angular speed of the brightness feature B' detected by the second image sensor 622'. In a straight line movement, a first moving vector of the brightness feature B detected by the first image sensor 622 is substantially identical to that detected by the second image sensor 622'. For example in the embodiment of FIG. 6C, when the optical mini-mouse 6 is rotated counterclockwise, the second angular speed is larger than and a first multiple of the first angular speed; whereas when the optical mini-mouse 6 is rotated clockwise, the first angular speed is larger than and a second multiple of the second angular speed, wherein the first and second multiples are determined according to a rotation curvature and the arrangement of the image sensors 622 and 622'. Accordingly, when a first rotation direction detected by the first image sensor 622 is identical to a second rotation direction detected by the second image sensor 622' as well as the first angular speed and the second angular speed have a multiple relationship with each other, the processor 623 identifies the rotation mode as a circular rotation mode.

In another embodiment, the detection of the rotation may be implemented by further employing a two-dimensional gravity sensor 17 or at least one RF transceiver module 18, e.g. RFID module. The method of detecting the rotation with a two-dimensional gravity sensor is well known and thus details thereof are not described herein. In one embodiment, a RF transceiver module 18 may be respectively disposed at two sides of the optical mini-mouse 1 so as to receive signals from a fixed position (for example, but not limited to, a host 82 or a display device 81). When the optical mini-mouse 1 is rotated, the signal strength received by the RF transceiver modules 18 is changed due to the change of distance from the fixed position so that the rotation may be detected accordingly. The RF transceiver module may be used to detect the distance, e.g. referring to EP Patent No. EP2127120A1. For example, a TAG may be respectively disposed at two different positions of a host 82 and the processor 132 then calculates distances between the TAGs and a mouse device to accordingly calculate the rotation. It is appreciated that the TAGs are not limited to be disposed on the host 82. If the optical mini-mouse 1 of the present disclosure is a wireless mouse, the RF transceiver module 18 may also be configured to transmit data to and from the host 82.

The finger detection module 13 is disposed in the operating region 11 and configured to detect a click event and/or a slide event in the operating region 11. For example, the finger detection module 11 may include at least one mechanical button, a roller, at least one capacitive switch and/or at least one optical switch disposed in the operating region 11.

In one embodiment, the finger detection module 13 may detect the click event and/or scroll event using a left key 131, a right key 132 and a roller 133 (as shown in FIG. 2B) of the conventional mouse, and the processor 123 then relatively controls a host 82 to display the corresponding operation on a display device 81, e.g. functions including the icon selection, screen scrolling and so on.

In another embodiment, the finger detection module 13 may detect the finger click (e.g. single click, double click or multiple click) using a capacitive switch (e.g. the single region shown in FIG. 2A) and detect the finger slide to be served as the scroll event. In another embodiment, the capacitive switch may be divided into different regions for detecting different fingers (e.g. FIG. 2B), wherein methods of detecting the finger click and slide are well known and thus details are not described herein.

In another embodiment, the finger detection module 13 may detect the finger click using an optical switch (e.g. the single region shown in FIG. 2A) and detect the finger slide to be served as the scroll event. In another embodiment, the optical switch may be divided into different regions for detecting different fingers (e.g. FIG. 2B). In this embodiment, when the finger detection module 13 includes an optical switch, the optical switch may share the same light source (e.g. 121) with the navigation module 12 or use a different light source.

It should be mentioned that although FIG. 3 shows that the navigation module 12 and the finger detection module 13 are coupled to the same processor 123, the present disclosure is not limited thereto. The finger detection module 13 may be coupled to another independent processor without sharing the same processor with the navigation module 12.

In one embodiment, the optical mini-mouse 1 may communicate with a host 82 through a wireless or wired communication technology, and thus the optical mini-mouse 1 may include a communication interface 15 (e.g. wireless or wired communication interface) disposed inside the accommodation space 10. For example, the optical mini-mouse 1 may further include a USB module, and the optical mini-mouse 1 performs the wired communication when being coupled to the host 82 through a USB interface (e.g. via a communication plug 151), and performs the wireless communication when said wired coupling is decoupled. The wireless or wired communication technologies are well known and thus details are not described herein.

In one embodiment, the optical mini-mouse 1 may include a battery module 14 disposed inside the accommodation space 10 configured to provide the power required in operation. For example, the optical mini-mouse 1 may further include a USB module, and the host 82 may provide the power for operation and charge the battery module 14 when the optical mini-mouse 1 is coupled to the host 82 through a USB interface. In another embodiment, the USB interface may only provide power for operation but the battery module 14 is not charged through the USB interface.

In one embodiment, the optical mini-mouse 1 may include a data storage module 16 disposed inside the accommodation space 10, and thus the optical mini-mouse 1 may be used as a flash disk to read data from or write data to the host 82 through a USB interface or a PS2 interface. Or the optical mini-mouse 1 may perform the wireless data transmission through the channel of the mouse device itself (i.e. the channel for transmitting movement).

In one embodiment, the finger detection module 13 may further be configured to detect physiological characteristics, e.g. including the fingerprint, pulse, blood oxygen and so on. For example, the optical mini-mouse 1 may be limited to be activated by predetermined user(s) through fingerprint so as to increase the data safety. For example, the optical mini-mouse 1 may include an optical finger mouse. The method of detecting the physiological characteristics by the finger detection module 13 may be referred to U.S. application Ser. No. 13/614,999 assigned to the same assignee of the present application.

In one embodiment, the navigation module 12 may use an adjustable report rate to report the calculated movement and/or rotation. For example, the value of the report rate may be determined according to the program currently being executed by the host 82. For example, when the host 82 is running a game program, the navigation module 12 may report the movement and/or rotation with a higher report rate; whereas when the host 82 is running a word processing program, the navigation module 12 may report the movement and/or rotation with a lower report rate, wherein the report rate may be adjusted by the user selection or by the optical mini-mouse 1 directly according to a signal sent from the host 2.

In the embodiment of the present disclosure, the accommodation space 10 is arranged at the rear part of the optical mini-mouse 1. Most elements of the optical mini-mouse 1 are disposed inside the accommodation space 10 to allow the gravity center to be at the rare part of the device so as to improve the user experience in operation.

In the embodiment of the present disclosure, the movement calculated by the optical mini-mouse 1 may be used to control a cursor on a display device 81, and the rotation calculated by the optical mini-mouse 1 may be used to control two-phase parameters that have two changing direction, such as volume, zooming and scrolling, without particular limitation. Therefore, when the optical mini-mouse 1 also has the function of detecting the rotation, the roller 133 may not be implemented and the function of the roller 133 may be replaced by the detected rotation; i.e. the finger detection module 13 may only detect the click event without detecting the slide event.

Figure 7:
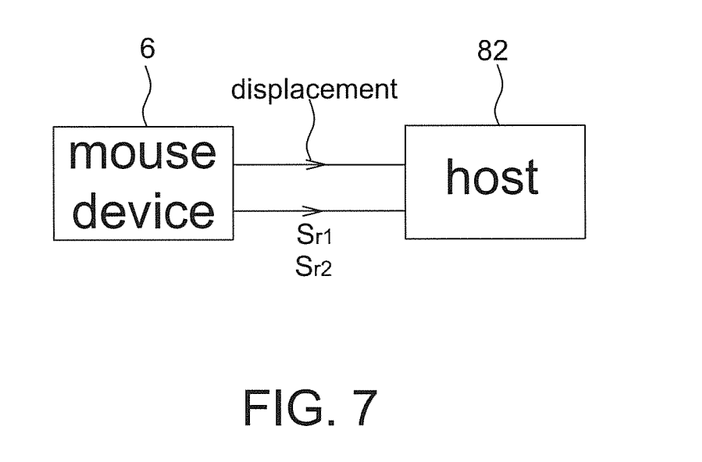
FIG. 7 is a schematic block diagram of a connection between an optical mini-mouse of the present disclosure and a host

Referring to FIG. 7, it is a schematic diagram of a connection between an optical mini-mouse 6 according to an embodiment of the present disclosure with a host 82, wherein the host 82 is included, for example, a computer system capable of controlling an electronic device, and the connection is a wired or wireless connection. In this embodiment, in addition to the synchronize signal, movement, physiology data and transmission data, the optical mini-mouse 6 further outputs an in-place rotation signal $S_{r1}$ and a circular rotation signal $S_{r2}$ to the host 82. The host 82 is installed with predetermined software applications to perform different functions corresponding to the in-place rotation signal $S_{r1}$, the circular rotation signal $S_{r2}$ and the movement, wherein the movement includes a magnitude and a direction. For example, the host 82 performs the two-phase parameter control such as zooming, volume and output strength according to the in-place rotation signal $S_{r1}$ and the movement. The host 82 performs different controls such as paging and device selection according to the circular rotation signal $S_{r2}$ and the movement. The rotation mode corresponding to the in-place rotation signal $S_{r1}$ and the circular rotation signal $S_{r2}$ are illustrated in FIGS. 6B and 6C. It is appreciated that control functions corresponding to the in-place rotation signal $S_{r1}$ and the circular rotation signal $S_{r2}$ are not limited to those give herein.

As mentioned above, the optical mini-mouse 6 includes a first image sensor 622 and a second image sensor 622'. In one embodiment, the processor 623 calculates the movement according to the image frames captured by one of the first image sensor 622 and the second image sensor 622', and sends the movement to the host 82 via the communication interface 15 to accordingly control a cursor motion. For example, the processor 623 calculates the movement according to the image frames captured by the first image sensor 622 without according to the image frames captured by the second image sensor 622', and identifies the rotation mode according to the image frames captured by both of the first image sensor 622 and the second image sensor 622' (as shown in FIGS. 6B-6C) to accordingly generate the in-place rotation signal $S_{r1}$ or the circular rotation signal $S_{r2}$.

In another embodiment, the processor 623 calculates an average movement according to image frames captured by the first image sensor 622 and the second image sensor 622', and sends the average movement to the host 82 via the communication interface 15 to accordingly control a cursor motion, wherein the average movement is obtained by averaging a first movement, which is calculated by comparing two first image frames F6 captured by the first image sensor 622, with a second movement, which is calculated by comparing two second image frames F6' captured by the second image sensor 622'. The processor 623 also identifies the rotation mode according to the image frames captured by both of the first image sensor 622 and the second image sensor 622' (as shown in FIGS. 6B-6C) to accordingly generate the in-place rotation signal $S_{r1}$ or the circular rotation signal $S_{r2}$.

Figure 8:
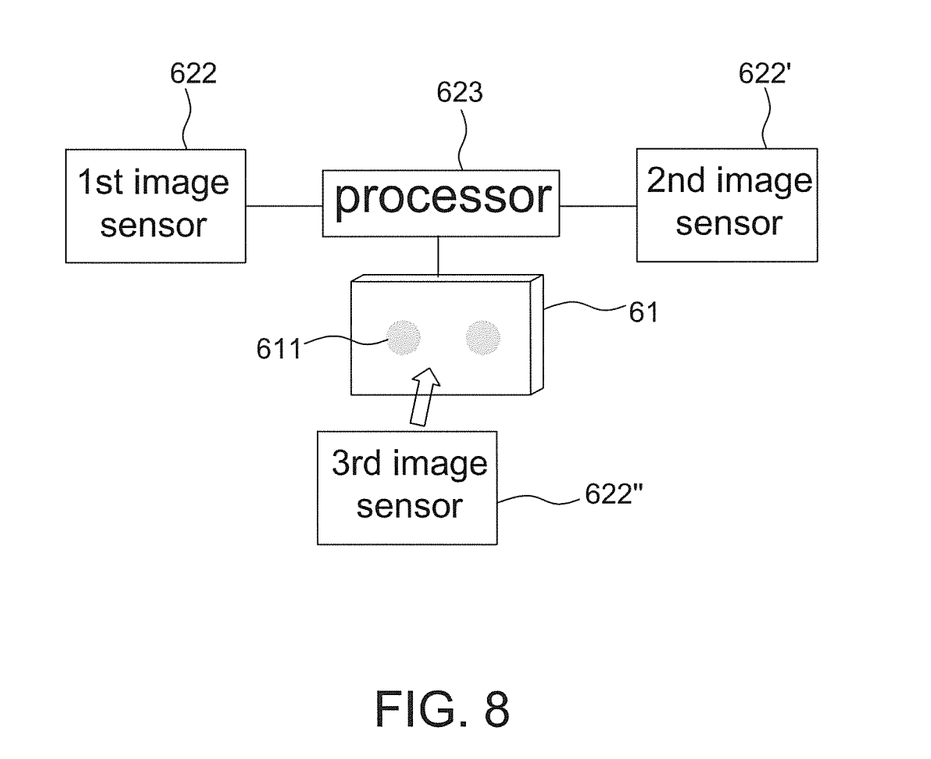
FIG. 8 is another schematic block diagram of an optical mini-mouse according to an embodiment of the present disclosure.

In an alternative embodiment, in addition to the first image sensor 622 and the second image sensor 622', the optical mini-mouse 6 further includes a third image sensor 622" (as shown in FIG. 8) specifically for detecting the movement outputted by the processor 623 but not for detecting the rotation operation. In other words, during operation the processor 623 compares the image frames captured by the third image sensor 622" to generate and output the movement to the host 82, but identifies the rotation mode according to the image frames captured by both of the first image sensor 622 and the second image sensor 622'. When the rotation operation is not identified, the processor 623 outputs the movement to the host 82 without outputting the rotation signal; whereas when the in-pace rotation or the circular rotation is detected, the processor 623 outputs both of the movement and one of the in-place rotation signal $S_{r1}$ and the circular rotation signal $S_{r2}$ to the host 82. When only the movement is outputted, the movement is for controlling the cursor motion. When both the movement and the rotation signal are outputted, the in-place rotation signal $S_{r1}$ and the circular rotation signal $S_{r2}$ are for triggering other predetermined functions and the movement are for controlling parameters of the triggered function.

More specifically, in the embodiment having a plurality of image sensors, a part of the image sensors are for detecting the movement to be outputted by the processor 623 and the other part of the image sensors are for detecting the rotation mode (as shown in FIGS. 6B and 6C). The image sensors share a same light source (e.g. 121) or correspond to a respective light source. The image sensors share a same processor (e.g. 123) or correspond to a respective processor. The image sensors have a same type (e.g. 122) or different types without particular limitations. According to different applications, the image sensor for detecting the movement to be outputted may or may not be used to detect the rotation and/or the rotation direction.

In other embodiments, at least a part of the image sensors is attachable to and detachable from the optical mini-mouse 6. For example, the optical mini-mouse 6 (or the navigation module thereof) further includes a bearing member 61 on which at least one electrical contact 611 is disposed. The bearing member 61 is used to carry an attachable-detachable image sensor package, e.g. the third image sensor 622". The electrical contact 611 is used to electrically couple to the corresponded electrical contact of the third image sensor 622". When the third image sensor 622" is attached to the bearing member 61, it is electrically coupled to the optical mini-mouse 6 via the electrical contacts.

In some embodiments, the attachable-detachable image sensor package includes at least a pixel array package. In some embodiments, the attachable-detachable image sensor package includes a package encapsulating at least a pixel array and an optical engine. Accordingly, when the user would like to update or exchange the attachable-detachable image sensor package, only the image sensor is changed without changing the whole optical mini-mouse 6. In addition, the method of combining the attachable-detachable image sensor package and the bearing member 61 does not have particular limitations, e.g. using the engagement member or securing member, but not limited thereto. It should be mentioned that although FIG. 8 takes the third image sensor 622" as an example to illustrate the attachable-detachable image sensor package, it is only intended to illustrate but not to limit the present disclosure. In some embodiments, all image sensors of the optical mini-mouse 6 are attachable-detachable image sensor packages, and a number of the bearing members corresponds to that of the attachable-detachable image sensor packages.

It should be mentioned that although the rotation, movement and rotation signals are generated by the processor 634 as illustrated above, as the image sensor and the processor are included in the navigation module 12, it is considered that the operation of the processor 623 is executed by the navigation module 12.

In other embodiments, the optical mini-mouse 6 detects only one of the in-place rotation mode and the circular rotation mode. For example, the navigation module of the optical mini-mouse 6 identifies whether the mouse case is rotated about the valley (e.g. the center C) according to the rotation directions detected by different image sensors. When a first rotation direction detected by a first image sensor (e.g. 622) among the image sensors is opposite to a second rotation direction detected by a second image sensor (e.g. 622') among the image sensors, the navigation module 12 confirms that the mouse case is rotated about the valley and outputs the in-place rotation signal $S_{r1}$; when the first rotation direction detected by the first image sensor is identical to the second rotation direction detected by the second image sensor, the navigation module 12 confirms that the mouse case is not rotated about the valley such that the in-place rotation signal $S_{r1}$ is not outputted and only the movement is outputted. In other embodiments, the navigation module 12 identifies whether the mouse case is rotated circularly according to the rotation directions detected by different image sensors. When the first rotation direction detected by the first image sensor (e.g. 622) is identical to the second rotation direction detected by the second image sensor (e.g. 622') and/or the angular speeds have a multiple relationship, the navigation module 12 confirms that the mouse case is rotated circularly and outputs the circular rotation signal $S_{r2}$; otherwise, the circular rotation signal $S_{r2}$ is not outputted and only the movement is outputted to the host 82.

The output of the in-place rotation signal $S_{r1}$ and the circular rotation signal $S_{r2}$ is determined according to the communication interface 15, e.g. in a wired or wireless manner.

As mentioned above, the conventional mini-mouse is grabbed by three fingers of a user in order to move on a work surface such that the user is easily get tired after a long-time operation. Therefore, the present disclosure further provides an optical mini-mouse (FIGS. 2A to 2B and 3) that may be moved easily on a work surface when a user naturally puts his/her fingers in an operating region of the mouse device thereby having the merit of easy operation. In addition, the optical mini-mouse may perform rotating operation so as to expand functions and increase the practicality thereof.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical mini-mouse, for being operated on a work surface, the optical mini-mouse comprising:
    a mouse case comprising an operating region and an accommodation space arranged along a length direction;
    a navigation module disposed inside the accommodation space and comprising a plurality of image sensors respectively configured to detect a rotation direction of the optical mini-mouse with respect to the work surface and identify a rotation mode according to the rotation directions detected by different image sensors; and
    a finger detection module configured to detect at least one of a click event and a slide event in the operating region.

2. The optical mini-mouse as claimed in claim 1, wherein a thickness of the accommodation space is between 0.7 cm and 1.3 cm, a width of the operating region is between 4 cm and 6 cm, and a thickness of the operating region is smaller than the thickness of the accommodation space.

3. The optical mini-mouse as claimed in claim 1, wherein when a first rotation direction detected by a first image sensor among the plurality of image sensors is opposite to a second rotation direction detected by a second image sensor among the plurality of image sensors, the rotation mode is an in-place rotation mode, and when the first rotation direction detected by the first image sensor is identical to the second rotation direction detected by the second image sensor, the rotation mode is a circular rotation mode.

4. The optical mini-mouse as claimed in claim 3, wherein when a first angular speed detected by the first image sensor is a multiple of a second angular speed detected by the second image sensor and when the first rotation direction detected by the first image sensor is identical to the second rotation direction detected by the second image sensor, the rotation mode is the circular rotation mode.

5. The optical mini-mouse as claimed in claim 3, wherein the navigation module is configured to output an in-place rotation signal to a host corresponding to the in-place rotation mode, and output a circular rotation signal to the host corresponding to the circular rotation mode.

6. The optical mini-mouse as claimed in claim 5, wherein the navigation module is further configured to calculate and output a movement to the host according to image frames captured by one of the first image sensor and the second image sensor.

7. The optical mini-mouse as claimed in claim 5, wherein the navigation module is further configured to calculate an average movement according to image frames captured by the first image sensor and the second image sensor, and output the average movement to the host.

8. The optical mini-mouse as claimed in claim 5, wherein the navigation module is further configured to calculate and output a movement to the host according to image frames captured by a third image sensor among the plurality of image sensors.

9. The optical mini-mouse as claimed in claim 1, wherein at least one of the plurality of image sensors is a attachable-detachable image sensor package.

10. An optical mini-mouse, for being operated on a work surface, the optical mini-mouse comprising:
a mouse case having a width and a length, and a first thickness and a second thickness along a length direction of the length;
a navigation module disposed inside an inner space of a region of the second thickness of the mouse case and comprising a plurality of image sensors respectively configured to detect a rotation direction of the optical mini-mouse with respect to the work surface and identify a rotation mode according to the rotation directions detected by different image sensors; and
a finger detection module formed in a region of the first thickness of the mouse case and configured to detect at least one of a click event and a slide event.

11. The optical mini-mouse as claimed in claim 10, wherein the width is between 4 cm and 6 cm, the length is between 3 cm and 5 cm, the first thickness is between 0.3 cm and 0.5 cm, and the second thickness is between 0.7 cm and 1.3 cm.

12. The optical mini-mouse as claimed in claim 10, wherein the width is larger than the length and the second thickness is larger than the first thickness.

13. The optical mini-mouse as claimed in claim 10, wherein
when a first rotation direction detected by a first image sensor among the plurality of image sensors is opposite to a second rotation direction detected by a second image sensor among the plurality of image sensors, the rotation mode is an in-place rotation mode, and
when the first rotation direction detected by the first image sensor is identical to the second rotation direction detected by the second image sensor, the rotation mode is a circular rotation mode.

14. The optical mini-mouse as claimed in claim 13, wherein when a first angular speed detected by the first image sensor is a multiple of a second angular speed detected by the second image sensor and when the first rotation direction detected by the first image sensor is identical to the second rotation direction detected by the second image sensor, the rotation mode is the circular rotation mode.

15. The optical mini-mouse as claimed in claim 13, wherein the navigation module is configured to output an in-place rotation signal to a host corresponding to the in-place rotation mode, and output a circular rotation signal to the host corresponding to the circular rotation mode.

16. The optical mini-mouse as claimed in claim 15, wherein the navigation module is further configured to calculate and output a movement to the host according to image frames captured by one of the first image sensor and the second image sensor.

17. The optical mini-mouse as claimed in claim 15, wherein the navigation module is further configured to calculate and output a movement to the host according to image frames captured by a third image sensor among the plurality of image sensors.

18. An optical mini-mouse comprising:
a mouse case comprising a valley and a flat region adjacently arranged along a length direction, wherein the valley extends along a width direction;
a navigation module comprising a plurality of image sensors respectively configured to detect a rotation direction of the optical mini-mouse with respect to the work surface and identify whether the mouse case is rotated about the valley according to the rotation directions detected by different image sensors; and
a finger detection module configured to detect at least one of a click event and a slide event of the valley.

19. The optical mini-mouse as claimed in claim 18, wherein a width of the optical mini-mouse is larger than a length thereof.

20. The optical mini-mouse as claimed in claim 18, wherein
when a first rotation direction detected by a first image sensor among the plurality of image sensors is opposite to a second rotation direction detected by a second image sensor among the plurality of image sensors, the navigation module is configured to identify that the mouse case is rotated about the valley.

* * * * *